June 27, 1950  E. F. BRUNING  2,512,999
COUPLING
Filed July 29, 1947  2 Sheets-Sheet 1
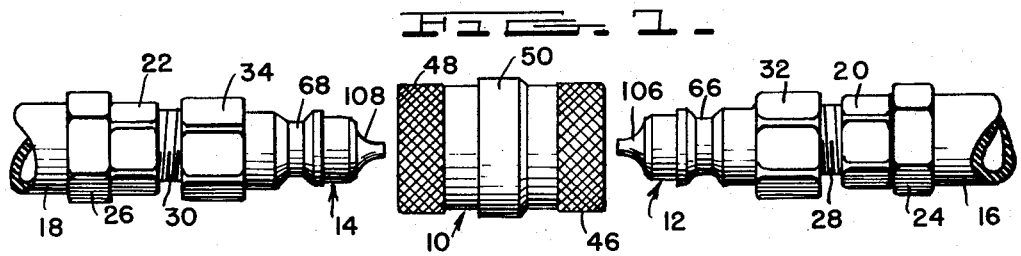
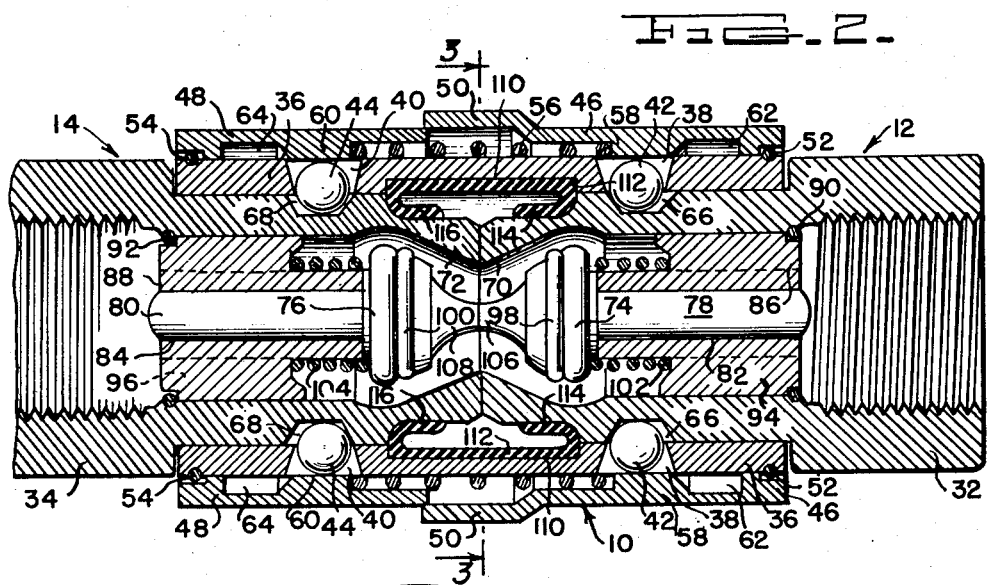
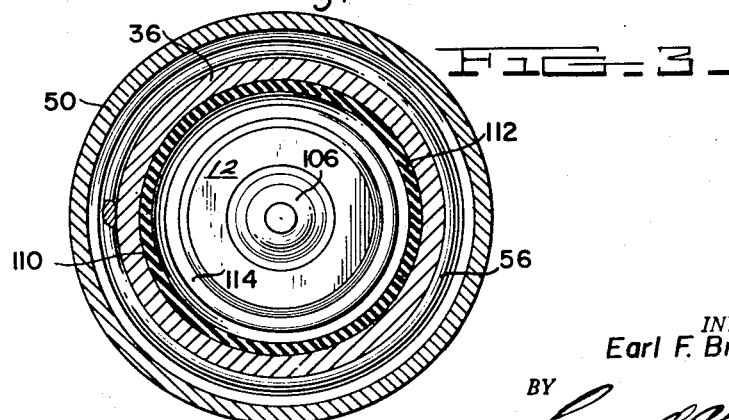
INVENTOR.
Earl F. Bruning
BY
Attorney June 27, 1950  E. F. BRUNING  2,512,999
COUPLING
Filed July 29, 1947  2 Sheets-Sheet 2

INVENTOR.
Earl F. Bruning
BY
Attorney

Patented June 27, 1950

2,512,999

UNITED STATES PATENT OFFICE 2,512,999

COUPLING

Earl F. Bruning, Lincoln, Nebr.

Application July 29, 1947, Serial No. 764,497

14 Claims. (Cl. 284—19)

The present invention relates generally to a coupling for connecting together conduits under fluid pressure.

More particularly this invention is directed to certain new and useful improvements in fluid coupling apparatus of the quick detachable type embodying valve means automatically operable upon disengagement to interrupt fluid flow through the coupling.

The principal object of the present invention is to provide quick detachable fluid coupling apparatus of the type described embodying a pair of substantially identical male pressure nipples held in engagement by a single female member in such manner as to automatically provide unimpeded fluid flow therethrough when engaged and to interrupt such flow upon disengagement of either nipple.

Another object of the invention is to provide an improved female member for a quick detachable coupling of the type described embodying a novel seal and locking mechanism and constituting an enclosed self-contained assembly.

A further object of the invention is to provide an improved male pressure nipple particularly adapted for use in a quick detachable fluid coupling apparatus of the type described.

An additional object of the invention is to provide an improved fluid pressure seal for a quick detachable coupling of the type described.

Yet another object of the invention is to provide an improved valve construction for a coupling of the type described so constructed as to maintain a positive pressure seal when closed and embodying improved fluid flow characteristics when open.

A still further object of the invention is to provide a fluid coupling of the general type described embodying a minimum number of working parts which may be inexpensively and expeditiously produced and which may be readily assembled or disassembled for replacement or repair.

The above as well as other objects and advantages of the invention together with a more complete understanding of the precise nature thereof will become more readily apparent to one skilled in the art from a consideration of the following detailed specification taken in conjunction with the accompanying drawings wherein:

Figure 1 is a front elevational view of an improved coupling in accordance with the present invention showing the parts in disassembled condition;

Figure 2 is a longitudinal cross-sectional view to an enlarged scale through the coupling of Figure 1 but showing the parts in completely assembled condition;

Figure 3 is a transverse cross-sectional view through the coupling taken substantially along the line 3—3 of Figure 2;

Figure 4:
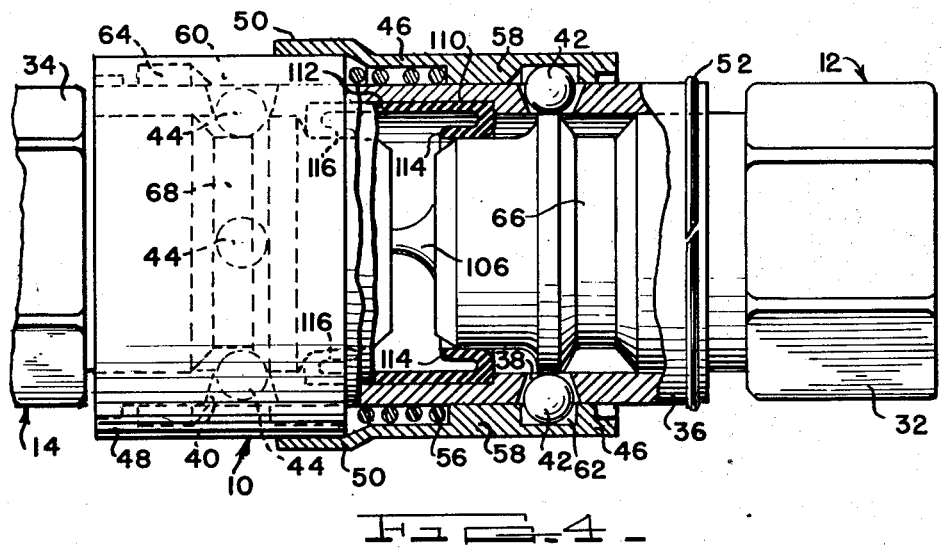
Figure 4 is a front elevational view of the coupling in partial cross-section illustrating the parts in partially assembled position.

Referring now in more detail to the various figures of the drawings and particularly to Figure 1 thereof, my improved coupling in accordance with the present invention is seen to comprise a female coupling member designated generally by reference numeral 10, of generally tubular form, adapted to receive in locked and pressure-tight relationship a pair of male pressure nipples designated generally by reference numerals 12 and 14 secured to the ends of a pair of fluid pressure conduits 16 and 18, respectively. The pressure nipples 12 and 14 are substantially identical in all respects so that it will be readily apparent that regardless of the number of pressure conduits which are to be connected together, the same type male and female fittings may be employed in every case. As illustrated in Figure 1 the pressure nipples 12 and 14 are connected to the respective conduits 16 and 18 through intermediate adapters 20 and 22 having male portions (not shown) threaded into the female fittings 24 and 26 and having oppositely directed threaded male portions 28 and 30 threadedly engaged within the outer head portions 32 and 34, respectively, of the nipples 12 and 14. It will be understood that the adapters 20 and 22 are provided in order to make possible the attachment of the female heads 32 and 34 to the respective female conduit fittings 24 and 26 and in actual practice may be furnished in various sizes or dispensed with entirely if not required.

As shown particularly in Figures 2 and 4, the female coupling member 10 comprises a generally tubular sleeve 36 having two sets of circumferentially spaced, radially tapered holes adjacent its opposite ends designated by reference numerals 38 and 40, respectively. The opposite sets of holes 38 and 40 are each provided with a set of locking members in the form of balls 42 and 44 which are capable of limited radial inward projection through their associated holes but have diameters slightly larger than the smallest diameter of such holes so as to prevent more than partial inward projection through the latter.

A pair of externally knurled collars 46 and 48 is slidably mounted on the exterior of the sleeve 36, the collar 46 being provided with an enlarged portion 50 adapted to slide over the inner end of the collar 48 in telescoping relation with the latter. Releasable snap rings 52 and 54 held in suitable grooves at the outer ends of the sleeve 36 serve to limit axial outward movement of the collars 46 and 48 relative to the sleeve 36. Axial inward movement of the collars 46—48 is permissible but is resisted by a resilient coil spring 56 surrounding the central portion of the sleeve 36 and abutting the inner radial faces of a pair of inwardly projecting flanges 58 and 60 formed on the respective collars 46 and 48. The collars 46 and 48 are also provided with internal circumferential grooves 62 and 64 adapted to partially receive the balls 42 and 44, respectively, when the collars 46 and 48 are in their inner position in a manner to be hereinafter more fully described.

As mentioned above the male pressure nipples 12—14 are substantially identical in the interests of uniformity and simplicity, thereby making it possible to connect any number of conduits together without the necessity of matching up various male and female fittings. As shown in Figure 2 the nipples 12 and 14 are in the form of hollow tubular fittings having the head portions 32 and 34 at their outer ends and having their inner ends turned to provide external circumferential locking grooves 66 and 68 adapted to be releasably engaged with the sets of balls 42 and 44, respectively, to hold the nipples 12 and 14 in endwise abutted relation within the sleeve 36.

The inner surfaces 70 and 72 of the nipples 12 and 14 are tapered towards the ends thereof to provide valve seats adapted to be engaged by poppet valves 74 and 76 when either of the nipples 12 or 14 becomes disengaged from the sleeve 36. The valves 74 and 76 are provided with valve stems 78 and 80, respectively, slidably received within guide passages 82 and 84 formed in a pair of valve cages 86 and 88, the latter being releasably secured in the central portion of the nipples 12 and 14 in any convenient manner as by means of snap rings 90—92, respectively. The valve cages 86 and 88 are provided with a plurality of longitudinal passages 94 and 96 permitting the free flow of fluid therethrough. The valves 74 and 76 are also preferably provided with resilient seals in the form of O-rings 98 and 100 of compressible material such as rubber or the like, mounted in suitable circumferential grooves in the outer sealing faces of said valves and a pair of coil springs 102 and 104 surround the respective inner portions of the valve cages 86—88 in such manner as to continuously urge the valves into closed position. Under relatively high pressure operating conditions it may be desirable to actually bond the seals within the grooves and in such cases the seals may be suitably contoured to blend in smoothly with the valve surface. It will also be manifest that the seal may be located with equal facility upon either the valve or valve seat or may in fact be omitted entirely where the valve and seat are properly ground to provide a metal-to-metal pressure tight seal.

At their inner ends the valves 74 and 76 are provided with reduced bosses 106 and 108 adapted to project axially beyond the inner ends of the nipples 12 and 14 and to abut each other to open the valves when the nipples 12 and 14 are both secured in endwise abutted position within the sleeve 36. The inner central portion of the sleeve 36 is provided with a relatively wide but shallow circumferential groove 110 which receives the flat base of a resiliently deformable annular seal 112 of approximately C-shape in cross section and provided with a pair of axial oppositely directed flexible sealing lips 114 and 116 adapted to engage in sealing relation with the outer peripheral surfaces at the inner ends of the nipples 12 and 14, respectively, when the latter are in coupled position.

Figure 5:
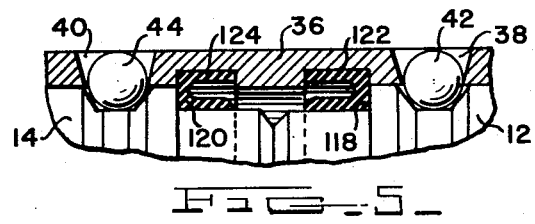
Figures 5, 6, and 7 are fragmentary detail cross-sectional views illustrating three modified forms of seal adapted to be employed in a coupling in accordance with the present invention.
Figure 6:
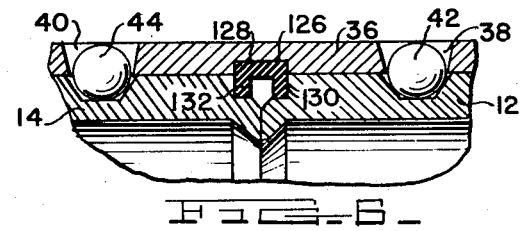
Figure 7:
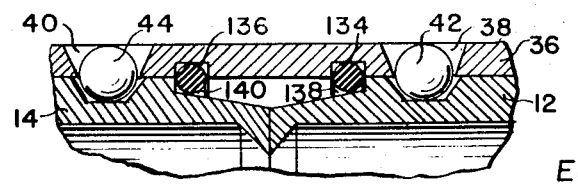

While I have illustrated in Figures 2 and 4 a preferred form of fluid seal in the form of the C-ring 112 having the flexible lips 114 and 116, I have also illustrated in Figures 5 to 7 three modified forms of seal which may be employed under certain circumstances in place of the C-ring 112. Thus, for example, in Figure 5, the C-ring 112 has been replaced by a pair of annular rubber seals 118 and 120 of substantially U-shape in cross section opening towards the center of the coupling and lying in a pair of grooves 122 and 124 formed in the inner wall of the sleeve 36. In Figure 6, the seal is in the form of a single annular member 126 of U-shape in cross section opening radially inward and having a flat base lying within a groove 128 in the inner wall of the sleeve 36 and a pair of substantially parallel flexible lips 130 and 132 projecting radially inward from the base and respectively adapted to engage in sealing relation with shoulders formed adjacent the ends of the nipples 12 and 14. In the device of Figure 7, the inner ends of the nipples 12 and 14 are both tapered and shouldered in such manner as to engage a pair of O-rings 134 and 136 of rubber or the like lying in grooves 138 and 140 formed in the inner wall of the sleeve 36.

Although the operation of my improved fluid coupling will be largely apparent from the foregoing description it may be briefly set forth as follows: Assuming the parts to be initially in the positions as illustrated in Figure 1 and bearing in mind that substantially identical male pressure nipples are provided at the opposite ends of all of the pressure conduits to be coupled together it will be noted that the bosses 106 and 108 of the respective pressure nipples 12 and 14 are projecting axially beyond the ends of these fittings thus indicating that the respective valves 74 and 76 are seated against the inner peripheral surfaces 70 and 72, the O-rings 98 and 100 forming a fluid-tight seal at these points. In order to perform a coupling operation the pressure nipples 12 and 14 are simply manually inserted into the female member 10 while the collars 46 and 48 are simultaneously pushed towards the center of the member 10 against the compression of the coil springs 56.

In Figure 4, the parts are illustrated in the relative positions which they occupy after the nipple 14 has been engaged in position within the member 10 and just prior to engagement of the nipple 12 therein. It will be noted in Figure 4 that the collar 46 has been slid axially or longitudinally of the sleeve 36 in such manner as to bring the annular groove 62 opposite the balls 42 so that the latter may be urged outwardly into the groove 62 to permit the passage of the nipple 12 into the sleeve 36. As soon as the nipple 12 has been fully inserted into the sleeve 36 the groove 66 in the outer periphery of the nipple 12 will then lie opposite the balls 42 and will be engaged by the latter as the collar 46 slides outwardly under the urging of the spring 56, causing the inclined face of the flange 58 to force the balls 42 into the groove 66 and firmly hold them in locked position. It will be understood that an identical sequence of operations will have taken place with regard to the balls 44 sliding in the holes 40 between the groove 64 in the collar 48 and the groove 68 adjacent the inner end of the nipple 14.

As the sequence of coupling operations described just above takes place, the bosses 106 and 108 at the inner ends of the valves 74 and 76 move into abutting position and, upon continued entering pressure upon either or both of the nipples 12—14, cause the valves 74 and 76 to move away from their seats 70—72 and into the positions illustrated in Figure 2. With the valves 74—76 in the positions shown in Figure 2 it will be noted that a smoothly curved passage is provided for the relatively unimpeded flow of fluid through the coupling and that substantially no sharp projections or the like are present to introduce turbulence and consequent molecular friction within the fluid. It will also be noted that any pressure fluid which leaks past the abutting ends of the pressure nipples 12 and 14 will be confined within the interior of the annular C-ring 112 in such manner that any increase of pressure therein will serve merely to increase the sealing effect by increasing the sealing pressure upon the flexible lips 114 and 116.

In order to disengage the coupling the operation is substantially the reverse of that previously described. Thus either or both of the collars 46—48 may be moved axially or longitudinally towards the center of the sleeve 36 in such manner as to bring the grooves 62 and 64 opposite the balls 42 and 44, respectively. The pressure nipples 12 and 14 may then be withdrawn from the sleeve 36, the inclined walls of the grooves 66 and 68 imparting a wedging action to the balls 42—44, urging them outwardly into the grooves 62—64.

As soon as the nipples 12 and 14 start to separate from their endwise abutted position the springs 102 and 104 start to close the valves 74 and 76 so that before either of the nipples 12—14 has been withdrawn sufficiently far to reduce the effectiveness of the seal 112 the valves 74—76 will be fully closed to prevent any loss of the pressure fluid. It will also be apparent that in the event of accidental uncoupling the valves 74—76 will move in a similar fashion to closed position thus preventing the loss of pressure fluid.

From a practical standpoint it will be understood that hydraulic couplers of the type described herein find one of their principal applications in use upon outdoor equipment such as farm machinery and the like which is customarily operated under dirty or dusty conditions. Accordingly, an important feature of my invention resides in the fact that the identical male pressure nipples both seal at the face without the employment of recessed sealing faces on either the coupler or the nipples. Thus dirt or other foreign matter is prevented from entering the hydraulic lines or the exposed fittings when the lines are disconnected and if the pressure nipples should become dusty at such time they can be easily and thoroughly cleaned by simply wiping them off with a cloth or even the bare hand just prior to performing a coupling operation as described above. It will also be apparent that the coupling sleeve can be very readily cleaned by simply running a rag therethrough.

It will also be apparent that my improved coupling is capable of a full swivelling action when engaged, thereby substantially eliminating any "kinking" or "twist strain" upon the hydraulic lines and fittings. Inasmuch as hydraulic couplings of this type are frequently employed under circumstances where considerable bending and twisting of the hydraulic lines is unavoidable this full swivelling feature will be readily seen to constitute an important advantage of my improved coupling.

Another point which it is particularly desired to emphasize is that in the operation of my improved coupling the valves are actually locked in full open position when the coupling is completely engaged. Thus the flow of pressure fluid through the coupling is unable to cause the valves to move in the direction of the flow so that the resultant jamming or chattering of the valves which is customarily encountered and which seriously restricts fluid flow through the lines is substantially eliminated.

Obviously numerous modifications, alterations, and deviations from the specific structures disclosed herein solely for the purpose of illustration will occur to one skilled in the art and it is to be understood that numerous changes can be made in size, materials, and arrangement of parts without departing from the principles of the invention as set forth in the appended claims.

Having thus described my invention, what I claim as novel and desire to secure by Letters Patent of the United States is:

1. Coupling apparatus for connecting together a pair of conduits under hydraulic pressure comprising, a tubular sleeve having a plurality of sets of circumferentially spaced radially tapered holes adjacent each end thereof, a plurality of sets of balls fitting in said holes and having diameters such as to prevent more than partial radial inward projection therethrough, a pair of externally knurled collars slidably mounted on the exterior of said sleeve each including an inwardly projecting flange thereon and an internal circumferential groove having a tapered end wall and adapted in one position to receive one of said sets of balls, a coil spring surrounding the central portion of said sleeve and abutting the inner radial faces of said flanges to urge said collars away from each other, one of said collars having an enlarged portion at its inner end slidable over the inner end of the other of said collars, releasable snap rings at opposite ends of said sleeve limiting axial outward movement of said collars relative thereto, a resiliently deformable annular seal of C-shape in cross section having a pair of oppositely directed sealing lips and lying within a groove formed around the central portion of the inner wall of said sleeve, and a pair of valved pressure nipples connected to the respective ends of said conduits and received in endwise abutted position within said sleeve each including a peripheral surface in sealing engagement with one of said lips and an external circumferential groove releasably engaged with one of said sets of balls.

2. Coupling apparatus for connecting together a pair of conduits under pressure comprising, a tubular sleeve having a plurality of sets of circumferentially spaced radially tapered holes adjacent each end thereof, a plurality of sets of balls fitting in said holes and having diameters such as to prevent more than partial radial inward projection therethrough, a pair of collars slidably mounted on the exterior of said sleeve each including an inwardly projecting flange thereon and an internal circumferential groove having a tapered end wall and adapted in one position to receive one of said sets of balls, a spring abutting the inner radial faces of said flanges to urge said collars away from each other, one of said collars having an enlarged portion at its inner end slidable over the inner end of the other of said collars, a resiliently deformable annular seal of C-shape in cross section having a pair of oppositely directed sealing lips and lying within a groove formed around the central portion of the inner wall of said sleeve, and a pair of valved pressure nipples connected to the respective ends of said conduits and received in endwise abutted position within said sleeve each including a peripheral surface in sealing engagement with one of said lips and an external circumferential groove releasably engaged with one of said sets of balls.

3. Fluid coupling apparatus comprising, a sleeve having a plurality of sets of circumferentially spaced radially tapered holes adjacent each end thereof, a plurality of sets of balls fitting in said holes and having diameters such as to prevent more than partial radial inward projection therethrough, a pair of collars slidably mounted on the exterior of said sleeve each including an inwardly projecting flange thereon and an internal circumferential groove having a tapered end wall and adapted in one position to receive one of said sets of balls, resilient means urging said collars away from each other, a resiliently deformable annular seal of C-shape in cross section having a pair of oppositely directed sealing lips and lying within a groove formed around the central portion of the inner wall of said sleeve, and a pair of valved pressure nipples received in endwise abutted position within said sleeve each including a peripheral surface in sealing engagement with one of said lips and an external circumferential groove releasably engaged with one of said sets of balls.

4. Fluid coupling apparatus comprising, a sleeve having a plurality of sets of circumferentially spaced holes adjacent each end thereof, a plurality of sets of locking members fitting in said holes and capable of limited inward projection therethrough, a pair of collars movably mounted on the exterior of said sleeve each including an internal groove adapted in one position to receive one of said sets of locking members, a resiliently deformable annular seal of C-shape in cross section having a pair of oppositely directed sealing lips and lying within a groove formed around the central portion of the inner wall of said sleeve, and a pair of valved pressure nipples received in endwise abutted position within said sleeve each including a peripheral surface in sealing engagement with one of said lips and an external groove releasably engaged with one of said sets of locking members.

5. In a fluid coupling for connecting together the ends of a pair of pressure conduits, a tubular sleeve having a plurality of sets of circumferentially spaced radially tapered holes adjacent the opposite ends thereof, a plurality of sets of locking balls fitting in said holes and having diameters such as to prevent more than partial radial inward projection therethrough, a pair of externally knurled telescoping collars slidably mounted on the exterior of said sleeve each including an inwardly projecting flange thereon and an internal circumferential groove having a tapered end wall and adapted in one position to receive one of said sets of balls, a coil spring surrounding the central portion of said sleeve and abutting the inner radial faces of said flanges to urge said collars apart, means limiting axial outward movement of said collars, and a resiliently deformable annular seal of C-shape in cross section having a pair of axial oppositely directed sealing lips and lying within a groove formed around the central portion of the inner wall of said sleeve.

6. In a fluid coupling for connecting together the ends of a pair of pressure conduits, a tubular sleeve having a plurality of sets of circumferentially spaced radially tapered holes adjacent the opposite ends thereof, a plurality of sets of locking balls fitting in said holes and having diameters such as to prevent more than partial radial inward projection therethrough, a pair of telescoping collars slidably mounted on the exterior of said sleeve each including an inwardly projecting flange thereon and an internal circumferential groove having a tapered end wall and adapted in one position to receive one of said sets of balls, resilient means abutting the inner radial faces of said flanges to urge said collars apart, and a resiliently deformable annular seal of C-shape in cross section having a pair of axial oppositely directed sealing lips and lying within a groove formed around the central portion of the inner wall of said sleeve.

7. In a fluid coupling, a sleeve having a plurality of sets of circumferentially spaced radially tapered holes adjacent the opposite ends thereof, a plurality of sets of locking balls fitting in said holes and having diameters such as to prevent more than partial radial inward projection therethrough, a pair of collars slidably mounted on the exterior of said sleeve each including an inwardly projecting flange thereon and an internal circumferential groove having a tapered end wall and adapted in one position to receive one of said sets of balls, and a resiliently deformable annular seal of C-shape in cross section having a pair of axial oppositely directed sealing lips and lying within a groove formed around the central portion of the inner wall of said sleeve.

8. In a fluid coupling, a sleeve having a plurality of sets of circumferentially spaced holes adjacent the opposite ends thereof, a plurality of sets of locking members mounted for limited inward projection through said holes, a pair of collars movably mounted on the exterior of said sleeve for controlling the position of said locking members, and a resiliently deformable annular seal disposed within a groove formed around the central portion of the inner wall of said sleeve.

9. In a fluid coupling, a sleeve having a plurality of sets of circumferentially spaced recesses adjacent the opposite ends thereof, a plurality of sets of locking members mounted for limited inward projection in said recesses, and a pair of collars movably mounted on the exterior of said sleeve for controlling the position of said locking members.

10. Fluid coupling apparatus comprising, a sleeve having a plurality of sets of circumferentially spaced holes adjacent each end thereof, a plurality of sets of locking members mounted for limited inward projection through said holes, a pair of telescoping collars movably mounted on the exterior of said sleeve for controlling the position of said locking members, a resiliently deformable annular seal of C-shape in cross section having a pair of axial oppositely directed sealing lips and disposed within a groove formed around the central portion of the inner wall of said sleeve, and a pair of male pressure nipples received in endwise abutted position within said sleeve each comprising a tubular fitting having its outer peripheral surface in sealing engagement with one of said lips and its inner surface tapered towards the end thereof, an external circumferential groove releasably engaged with one of said sets of locking members, a valve cage secured centrally of said fitting against axial movement relative thereto having a plurality of fluid passages therethrough and a guide passage at the center thereof, a poppet valve having a stem slidable in said guide passage and a circumferential resilient O-ring seal engageable with said tapered inner surface, spring means urging said valve towards closed position, and a boss formed centrally of said valve and projecting axially beyond the end of said fitting when said valve is in closed poistion for engagement by the corresponding boss projecting from the other of said fittings.

11. Fluid coupling apparatus comprising, a sleeve having a plurality of sets of locking members movably mounted adjacent opposite ends thereof, a resiliently deformable annular seal of C-shape in cross section having a pair of axial oppositely directed sealing lips and disposed within a groove formed around the central portion of the inner wall of said sleeve, and a pair of male pressure nipples received in endwise abutted position within said sleeve each comprising a tubular fitting having its outer peripheral surface in sealing engagement with one of said lips and its inner surface tapered towards the end thereof, an external circumferential groove releasably engaged with one of said sets of locking members, a valve cage secured centrally of said fitting against axial movement relative thereto and having a plurality of fluid passages therethrough, a poppet valve engageable with said tapered inner surface, and a boss formed centrally of said valve and projecting axially beyond the end of said fitting when said valve is in closed position for engagement by the corresponding boss projecting from the other of said fittings.

12. Fluid coupling apparatus comprising, a sleeve having a plurality of sets of locking members movably mounted adjacent opposite ends thereof, and a pair of male pressure nipples received in endwise abutted position within said sleeve each comprising a tubular fitting having its inner surface tapered towards the end thereof, an external circumferential groove releasably engaged with one of said sets of locking members, a valve cage secured centrally of said fitting against axial movement relative thereto and having a plurality of fluid passages therethrough, a valve engageable with said tapered inner surface, and a boss formed centrally of said valve and projecting axially beyond the end of said fitting when said valve is in closed position for engagement by the corresponding boss projecting from the other of said fittings.

13. In a fluid coupling comprising a tubular sleeve having a pair of annular central grooves in its inner periphery and adapted to receive in endwise abutted position a pair of male pressure nipples each provided with a shouldered and tapered end portion, a pair of resiliently deformable, annular seals of O-shape in cross section lying in said grooves and respectively adapted to engage in sealing relation with the shouldered and tapered end portions of said nipples.

14. Fluid coupling apparatus comprising, a female coupling member, a pair of male pressure nipples adapted to be received within said member, sealing means within said member cooperable with each of said male pressure nipples to prevent loss of pressure fluid between said member and said nipples at intermediate positions during insertion of the latter into said member, locking means on said member for releasably retaining said nipples therein, and valves in each of said nipples having actuating elements projecting beyond the ends of the latter and adapted to contact each other to positively maintain said valves in full open position whenever said nipples are fully engaged within said member.

EARL F. BRUNING.

REFERENCES CITED

The following references are of record in the file of this patent:

UNITED STATES PATENTS

| Number | Name | Date |
| --- | --- | --- |
| 1,493,306 | Wilkinson | May 6, 1924 |
| 2,017,994 | Spang | Oct. 22, 1935 |
| 2,049,801 | Gage | Aug. 4, 1936 |
| 2,067,428 | Wallis | Jan. 12, 1937 |
| 2,135,221 | Scheiwer | Nov. 1, 1938 |
| 2,182,797 | Dillon | Dec. 12, 1939 |
| 2,322,449 | Johnson et al. | June 22, 1943 |
| 2,346,051 | Seamark | Apr. 4, 1944 |
| 2,369,770 | Baxter | Feb. 20, 1945 |
| 2,428,638 | Scheiwer | Oct. 7, 1947 |